(12) United States Patent
Sindezingue et al.

(10) Patent No.: US 12,698,082 B2
(45) Date of Patent: Aug. 4, 2026

(54) DISCHARGE VALVE FOR AN AIRCRAFT AND ASSOCIATED METHOD

(71) Applicant: SAFRAN AEROSYSTEMS FLUID, Soignolles-en-Brie (FR)

(72) Inventors: Denis Sindezingue, Moissy-Cramayel (FR); David Cosoleto, Moissy-Cramayel (FR); Patrick Bourbon, Moissy-Cramayel (FR)

(73) Assignee: SAFRAN AEROSYSTEMS FLUID, Soignolles-en-Brie (FR)

( * ) Notice: Subject to any disclaimer, the term of this patent is extended or adjusted under 35 U.S.C. 154(b) by 576 days.

(21) Appl. No.: 18/248,550

(22) PCT Filed: Oct. 15, 2021

(86) PCT No.: PCT/FR2021/051803
§ 371 (c)(1),
(2) Date: Apr. 11, 2023

(87) PCT Pub. No.: WO2022/079398
PCT Pub. Date: Apr. 21, 2022

(65) Prior Publication Data
US 2023/0406507 A1 Dec. 21, 2023

(30) Foreign Application Priority Data
Oct. 15, 2020 (FR) ...................................... 2010536

(51) Int. Cl.
*B64D 11/02* (2006.01)
(52) U.S. Cl.
CPC .................................... *B64D 11/02* (2013.01)

(58) Field of Classification Search
CPC .. B64D 11/02; Y10T 137/7902; F16K 35/025
(Continued)

(56) References Cited

U.S. PATENT DOCUMENTS

| | | | |
|---|---|---|---|
| 4,098,427 A | 7/1978 | Duckworth, Jr. | |
| 4,690,296 A | 9/1987 | Elliott | |

(Continued)

FOREIGN PATENT DOCUMENTS

| | | | |
|---|---|---|---|
| FR | 2 561 744 A1 | 9/1985 | |

OTHER PUBLICATIONS

International Search Report mailed Feb. 14, 2022, issued in corresponding International Application No. PCT/FR2021/051803, filed Oct. 15, 2021, 7 pages.

(Continued)

*Primary Examiner* — Reinaldo Sanchez-Medina
*Assistant Examiner* — Nicole Gardner
(74) *Attorney, Agent, or Firm* — CHRISTENSEN O'CONNOR JOHNSON KINDNESS PLLC

(57) ABSTRACT

A discharge valve for an aircraft includes a cylindrical body having an inlet and an outlet, a first valve, and a second valve arranged inside the body. The first and the second valves are rotatable around a first axle and a second axle, respectively, between a closed position and an open position. A mechanism for locking the second valve in the closed position includes a control lever arranged around a third axle, an interface arranged on the second valve, and a device for rotating the third axle. The control lever is rotatably movable around the third axle between an unlocking position, in which the interface is in abutment against the drive device, and a locking position, in which the interface is engaged in the drive device.

11 Claims, 6 Drawing Sheets

(58) Field of Classification Search
    USPC ........................................ 220/259.2; 222/546
    See application file for complete search history.

(56)                          References Cited

U.S. PATENT DOCUMENTS 5,056,678 A  *  10/1991  Grills ..................... B64D 11/02
                                                            220/849
5,237,709 A       8/1993  Byerly et al.
5,246,131 A       9/1993  Shaw et al.
5,535,784 A       7/1996  Saville et al.

OTHER PUBLICATIONS

Written Opinion mailed Feb. 14, 2022, issued in corresponding
International Application No. PCT/FR2021/051803, filed Oct. 15,
2021, 9 pages.

* cited by examiner

DISCHARGE VALVE FOR AN AIRCRAFT AND ASSOCIATED METHOD

FIELD OF THE DISCLOSURE

The disclosure relates to the technical field of discharge valves for an aircraft.

More particularly, the disclosure relates to the technical field of double flap discharge valves for an aircraft.

BACKGROUND

The prior art is illustrated by the documents US-A1-4 690 296 and US-A1-5 237 709.

The aircrafts are typically equipped with a tank to collect wastewater during the flight. The wastewater is then disposed of after the aircraft has landed.

For this purpose, the aircraft is equipped with a discharge valve arranged on the fuselage of the aircraft. The wastewater flows from the tank through the discharge valve by gravity, or by suction and is collected in a wastewater collection device.

The discharge valve allows the tank to be opened and discharged during the maintenance of the aircraft after landing. It also allows the tank to be closed when the aircraft is in operation.

Typically, the discharge valve comprises a cylindrical body having an inlet orifice and an outlet orifice. The inlet orifice is in fluid communication with the tank and the outlet orifice is intended to receive a wastewater collection device and possibly a suction device to discharge the tank.

Furthermore, in order to ensure the sealing of the valve, the latter comprises a first flap and a second flap which is arranged inside the body of the valve. The flaps are mobile in rotation between an opening and a closing position. When the flaps are in the opening position, discharging the tank can be carried out through the valve, while when the flaps are in the closed position, the valve prevents wastewater from leaving the tank.

The second flap is in direct contact with the wastewater and thus forms the first sealing barrier of the valve. The first flap reinforces the sealing of the valve and thus provides a second barrier to seal the valve.

Therefore, the closing of the second flap is particularly important in the design of the discharge valve. Indeed, an improper closing of the second flap can lead to a leakage of wastewater through the second flap. This allows wastewater to accumulate in the space between the first and second flap. The simple opening of the first flap in this case leads to the leakage of wastewater through the valve, before the water collection and possibly suction device can be put in place.

To this end, the document U.S. Pat. No. 5,246,131 proposes a discharge valve for an aircraft comprising a cylindrical body, a first flap and a second flap which is arranged in the cylindrical body and a mechanism for locking the second flap in the closed position. The mechanism for locking the second flap comprises an interface arranged on the second flap and means for rotating a lever mounted about an axis. In the closed position of the flap, the interface engages the drive means and locks the second flap. When opening, the lever is driven in rotation to release the interface.

Such a locking mechanism does not provide complete satisfaction. This is because deposits from wastewater can build up and interfere with the mechanism for locking the second flap. In such a case, there is no way for the operator to ensure that the interface is properly engaged in the drive system and that the second flap is therefore correctly locked. A failure of the mechanism for locking the second flap is therefore not detectable in such a valve.

Therefore, there is a need to provide a discharge valve with a reliable mechanism for locking the second flap.

SUMMARY

To this end, the disclosure provides a discharge valve for an aircraft comprising:
- a cylindrical body having an inlet orifice and an outlet orifice,
- a first flap,
- a second flap arranged inside the body, the first and second flaps being mobile in rotation about a first axle and a second axle respectively, between a closed position and an open position,
- a mechanism for locking the second flap in the closed position comprising:
    - a control lever arranged around a third axle,
    - an interface arranged on the second flap and
    - a drive device for rotating the third axle.

The valve is characterised in that the control lever is mobile in rotation about the third axle between an unlocked position wherein the interface is in abutment against the drive device and a locking position wherein the interface is engaged with the drive device.

The discharge valve according to the disclosure therefore comprises a mechanism for locking the second flap in the closed position comprising a control lever that can be mobile in rotation between a locking and unlocking position. In the unlocked position, the interface is in abutment with the drive device and in the locking position, the interface is engaged with the drive device. The rotational movement of the control lever between these two positions is visible to the operator and confirms that the second flap is closed and locked. Thus, when the second flap is closed, the absence of a second rotational movement of the control lever alerts the operator to a lack of correct locking of the second flap. The valve thus has a reliable mechanism for locking the second flap.

The valve according to the disclosure may comprise one or more of the following characteristics, taken alone or in combination with each other:
- the drive device comprises a rack having a toothed body cooperating with the third axle and an end portion adapted to cooperate with the interface,
- the end portion has a notch into which the interface is adapted to engage and a free end with which the interface can come into abutment,
- the drive device comprises a ring secured to the third axle and having a surface with which the interface can come into abutment and a groove into which the interface is adapted to engage,
- the drive device comprises a first cylinder having a first cylindrical body and a first free end adapted to cooperate with the interface, and a second cylinder having a second cylindrical body and a second free end adapted to cooperate with the interface, the third axle being engaged in the first and second cylindrical bodies,
- the third axle comprises a free end having a tenon and the first cylindrical body has a first housing, and the second cylindrical body has a second housing, the tenon being engaged in the first and second housings,
- the second free end is bevelled, the third axle is arranged in a wall mounted on the cylindrical body of the valve opposite the first and second axles with respect to a longitudinal axis of the cylindrical body, a main lever extending over the first flap adapted to drive the first flap and the second flap from the open position to the closed position, the ring comprises a pointed end adapted to come into abutment with the complementary surface when the second flap opens, the ring has an internal surface adapted to come into abutment with a complementary surface of the interface when the second flap is opened, the internal surface being connected to an external surface of the ring by an edge forming the pointed end, the control lever is mobile in rotation in the unlocking position in a first direction and in the locking position in a second direction opposite to the first direction, the control lever is secured in rotation with the third axle.

The disclosure also relates to a method of locking a second flap of a valve according to any one of the above characteristics, comprising the following steps of:

(a') closing the second flap, (b') rotating the control lever into the unlocked position in which the interface comes into abutment with the drive device, (c') rotating the control lever into the locking position in which the interface is engaged with the drive device.

The disclosure also relates to an aircraft comprising at least one valve according to any one of the above characteristics.

DESCRIPTION OF THE DRAWINGS

Further characteristics and advantages will be apparent from the following description of a non-limiting embodiment of the disclosure with reference to the appended drawings in which.

DETAILED DESCRIPTION

Figure 1:
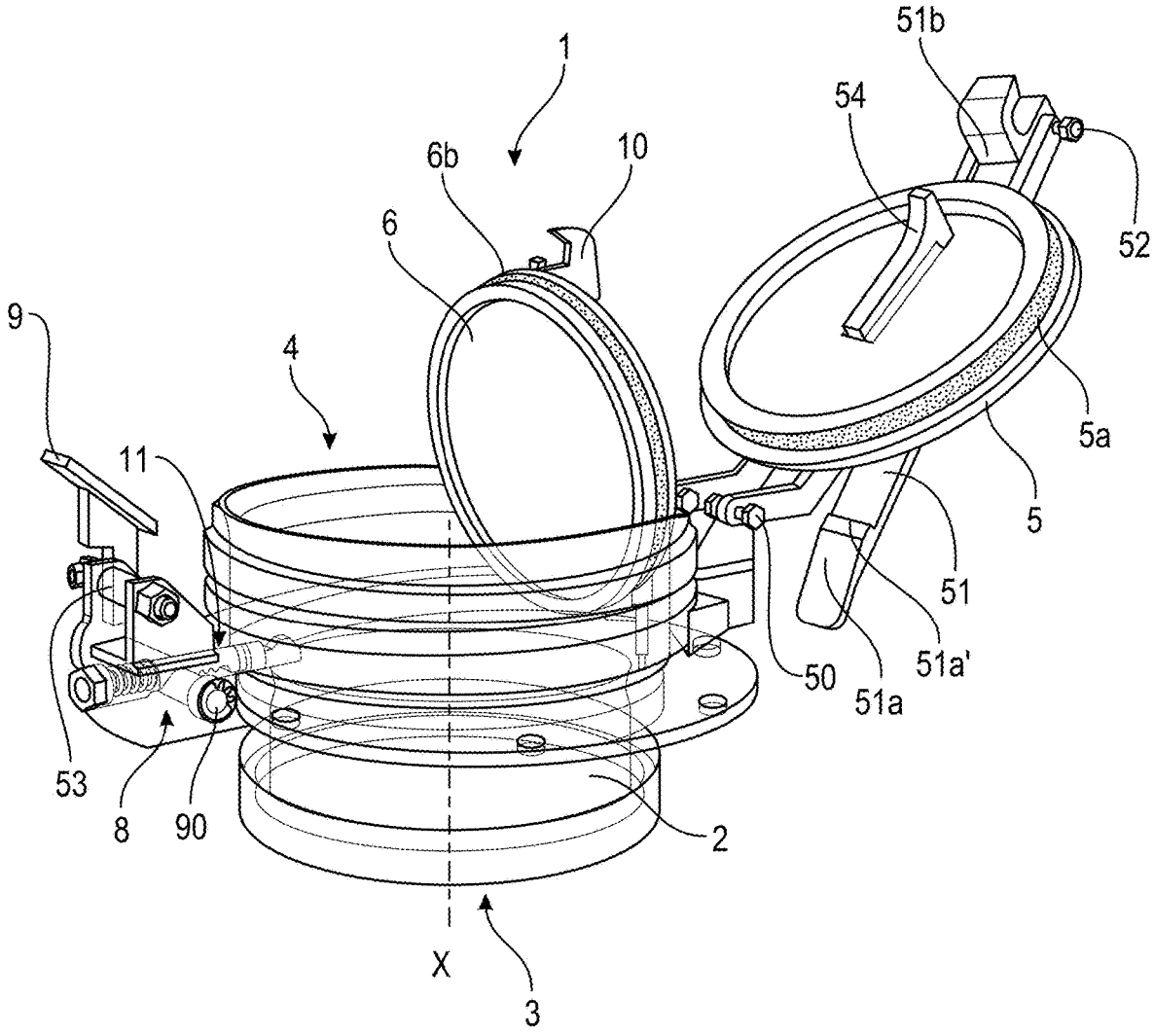
FIG. 1 is a perspective view of the valve according to the disclosure in the open position.

A discharge valve 1 for an aircraft (not shown) is for example shown in FIG. 1 in the open position. The valve 1 is typically arranged in a fuselage of the aircraft. The valve 1 can be used, for example, to close or open a wastewater tank of the aircraft.

The valve 1 comprises a cylindrical body 2. The body 2 extends along a longitudinal axis X. The body 2 is for example made of a metallic material such as stainless steel. The body 2 is hollow to allow the flow of wastewater into the valve 1. The body 2 has an inlet orifice 3 and an outlet orifice 4. The inlet orifice 3 is intended to be in fluid communication with the tank. The outlet orifice 4 is intended to be connected to a collection and possibly suction device (not shown) for wastewater.

The valve 1 furthermore comprises a first flap 5 and a second flap 6. The first flap 5 and the second flap 6 can be rotated or pivoted between a closed and an open position. Advantageously, the first flap 5 and the second flap 6 open in the same direction. In the example of embodiment shown in FIG. 1, the first flap 5 and the second flap 6 open towards the outside with respect to body 2 of the valve 1.

The first flap 5 is used to reinforce the sealing of the valve 1. When the valve 1 is closed by the first and second flaps 5, 6, the first flap 5 covers the second flap 6. The first flap 5 is circular. Advantageously, it comprises a peripheral annular groove in which a first seal 5a is arranged. The first flap 5 is mobile in rotation about a first axle 50. The first axle 50 extends perpendicular to the longitudinal axis X. The first axle 50 is advantageously mounted on the cylindrical body 2.

In order to facilitate the opening and closing of the first flap 5, the valve 1 comprises a main lever 51 extending over the first flap 5. The main lever 51 is longer than the diameter of the first flap 5. The main lever 51 has a first end opposite the first axle 50 with respect to the longitudinal axis X when the first flap 5 is closed and a second end opposite the first end. The main lever 51 comprises a handle 51a arranged on the second end, allowing the operator to grip the first flap 5 and a locking hook 51b arranged on the first end of the main lever 51. The handle 51a comprises for example an internal surface with a lug 51a' which is able to cooperate with the first flap 5 in the closed position to lock the main lever 51. The main lever 51 is mobile in rotation about a lever axle 52 arranged on the first end. In the closed position of the first flap 5, the locking hook 51b cooperates with a locking rod 53 arranged on the cylindrical body 2. The locking rod 53 extends perpendicularly to the longitudinal axis X and parallel to the first axle 50. The locking rod 53 is arranged opposite the first axle 50 with respect to the longitudinal axis X.

Furthermore, advantageously, the first flap 5 comprises a cam 54 extending from an internal surface of the first flap 5. The cam 54 is able to cooperate with the second flap 6 when the first and second flaps 5, 6 are closed.

Figure 2:
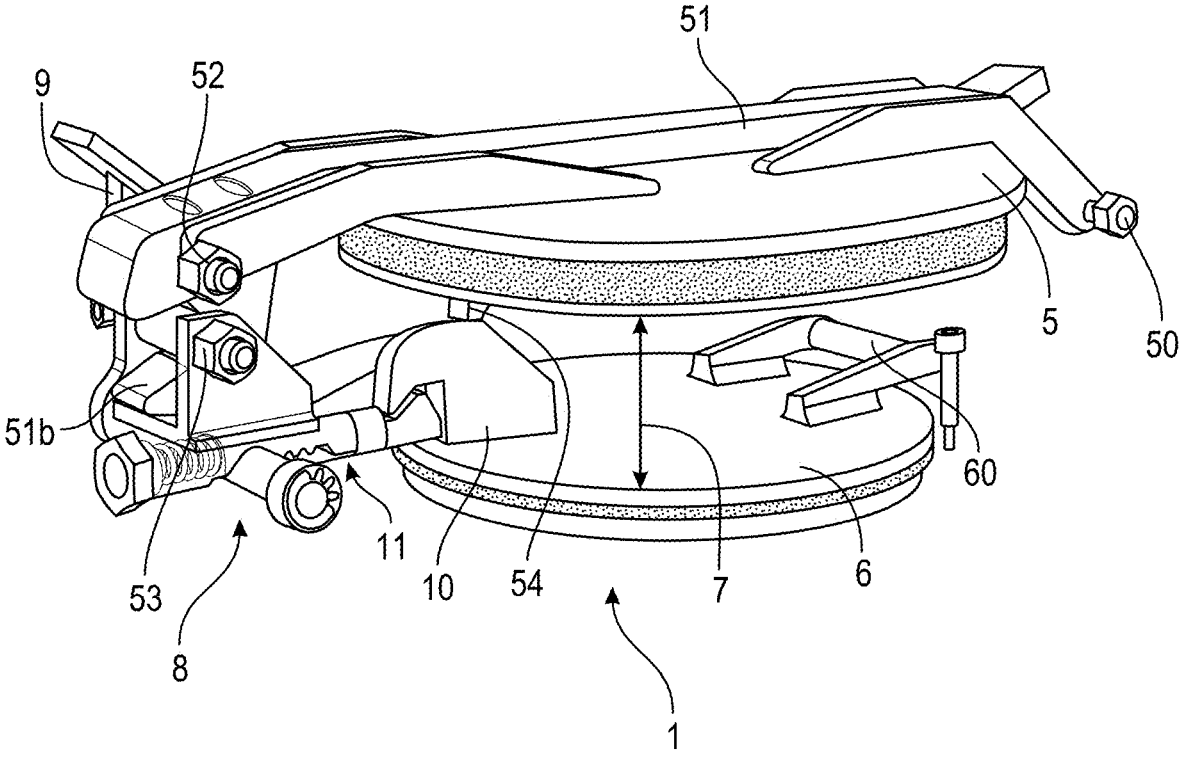
FIG. 2 is a simplified perspective view of the valve according to the disclosure in the closed position.

The second flap 6 forms a first sealing barrier for the valve 1. The second flap 6 is intended to be in direct contact with the wastewater in the tank. The second flap 6 is arranged inside the cylindrical body 2. In the closed position, the second flap 6 is in contact with the wastewater. The second flap 6 is advantageously circular. The diameter of the second flap 6 is smaller than the diameter of the first flap 5. Advantageously, the second flap 6 comprises a peripheral annular groove in which a second seal 6b is arranged. As best seen in FIG. 2 showing the valve 1 in the closed position without the cylindrical body 2 to make visible the elements located in the cylindrical body 2 such as the second flap 6, the second flap 6 is mobile in rotation or pivoting around a second axle 60. The second axle 60 extends parallel to the first axle 50 and is arranged inside the cylindrical body 2.

As shown in FIG. 2, when the first flap 5 and the second flap 6 are closed, the valve 1 advantageously comprises an intermediate space 7 delimited by the first flap 5 and the second flap 6.

Advantageously, the first flap 5 and the second flap 6 are driven to the closed position simultaneously. For example, the first flap 5 can come into abutment with the second flap 6 to drive the second flap 6 into a closed position.

In addition, the valve 1 comprises a mechanism 8 for locking the second flap 6 in the closed position. The locking mechanism 8 comprises a control lever 9 arranged around a third axle 90, an interface 10 arranged on the second flap 6 and a drive device 11 in rotation of the third axle 90.

The interface 10 has a height measured along the longitudinal axis X equal to the height of the intermediate space 7. The interface 10 extends from an external surface of the second flap 6. The interface 10 is arranged in the intermediate space 7. Thus, the interface 10 cooperates with the first flap 5, in particular with the cam 54, when closing the first and second flaps 5, 6 in order to facilitate the driving of the second flap 6 by the first flap 5 in closed position.

The control lever 9 is mobile in rotation about the third axle 90 between a locking position and an unlocking position. In the locking position, the interface 10 is engaged with the drive device 11. In the unlocked position, the interface 10 is in abutment with the drive device 11. In particular, the control lever 9 is mobile in rotation in a first direction in the locking position and in a second direction opposite to the first direction in the unlocking position. When the second flap 6 is driven to the closed position, the interface 10 comes into abutment with the drive device 11 defining the unlocked position. By abutment, it is understood that the interface 10 is supported on the drive device 11. The force exerted by the interface 10 on the drive device 11 causes the third axle 90 and the control lever 9 to rotate in the second direction. The interface 10 is then engaged, i.e., housed in the drive device 10, and no longer exerts any force on the drive device 11, which causes the third axle 90 and the control lever 9 to rotate in the first direction into the locking position.

The control lever 9 extends along an axis parallel to the longitudinal axis X when the second flap 6 is closed and locked. It has one end arranged around the third axle 90 and an opposite end. Preferably, a seal (not shown) is arranged between the control lever 9 and the third axle 90.

The third axle 90 extends parallel to the first axle 50 and the second axle 60. The third axle 90 is arranged in a wall mounted on the cylindrical body 2, opposite the first axle 50 and the second axle 60 with respect to the longitudinal axis X. The third axle 90 has a first free end on which the control lever 9 is arranged and a second free end opposite the first free end.

Figure 3:
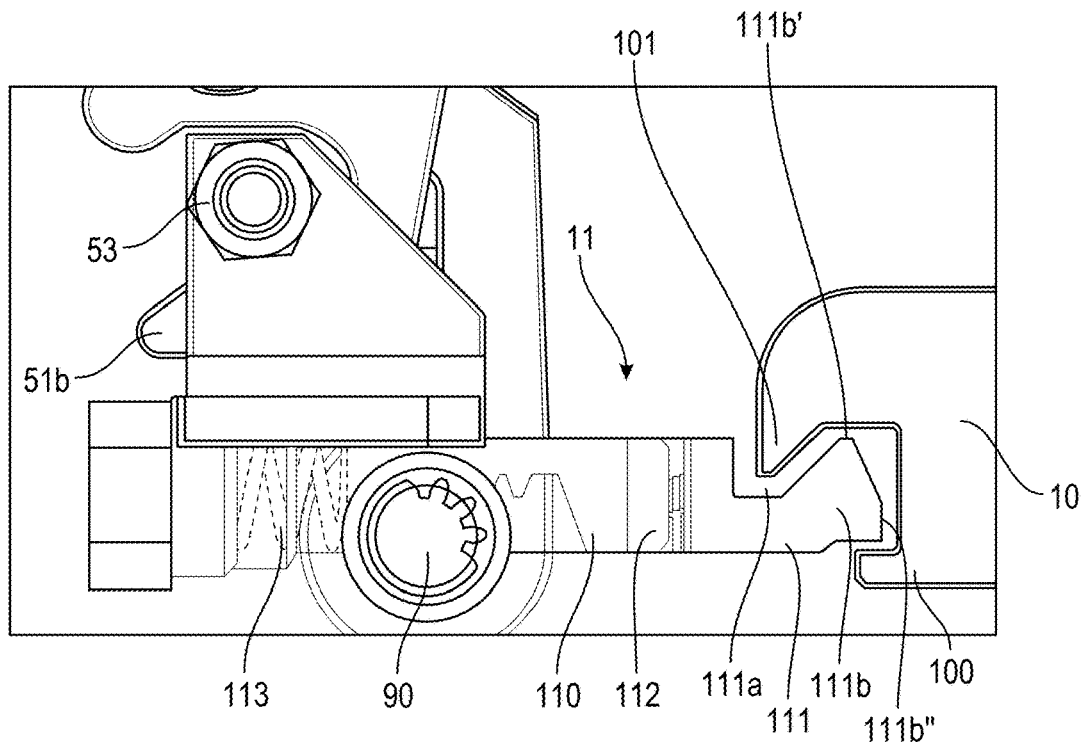
FIG. 3 is an enlarged side view of the drive device of the mechanism for locking the valve according to a first example of embodiment.

In a first embodiment shown in FIG. 3, the drive device 11 comprises a rack. The rack extends along an axis perpendicular to the third axle 90 and to the longitudinal axis X. The rack comprises a toothed body 110 cooperating with the third axle 90 and an end portion 111 adapted to cooperate with the interface 10. Advantageously, a third seal 112 is arranged between the toothed body 110 and the end portion 111. More particularly, the end portion 111 comprises a notch 111a into which the interface 10 is adapted to engage and a free end 111b with which the interface 10 can come into abutment. The free end 111b has a first surface 111b′ adapted to come into abutment with a hook 101 of the interface 10 when the second flap 6 is opened. The free end 111b further comprises a second surface 111b″ adapted to come into abutment with a complementary first surface 100 of the interface 10 upon closure of the second flap 6. The hook 101 is further adapted to engage in the notch 111a when closing and locking the second flap 6.

Advantageously, the drive device 11 comprises a spring 113 arranged on an end of the rack opposite the end portion 111.

According to this first embodiment, the operator drives the first flap 5 in rotation to the closed position, which rotates the second flap 6 to the closed position. The main lever 51 is then locked in order to lock the first flap 5. Simultaneously, the interface 10 of the second flap 6 comes into abutment with the free end 111b of the end portion 111 of the rack. This has the effect of driving the main body 110 in translation in a plane perpendicular to the longitudinal axis X in a first direction driving the third axle 90 in rotation. The control lever 9 is then driven in rotation into the unlocked position in the first direction. By a return force exerted by the spring 113 on the main body 110, the rack is driven in translation in a second direction opposite to the first direction. The interface 10 then engages in the notch 111a locking the second flap 6 in the locking position. The third axle 90 is driven in rotation by the rack, driving in rotation the control lever 9 in the locking position, in a second direction opposite to the first direction. This can also be done by the operator, if the return force is not sufficient, in particular, in case of deposits on the second flap 6.

To open the second flap, the operator operates the control lever 9 in the first direction to drive in rotation the third axle 90. The rack is then driven in translation until the first surface 111b′ of the free end 111b of the end portion 111 of the rack comes in abutment with the hook 101 of the interface 10. The force exerted on the interface 10 by the rack is used to drive in rotation the second flap 6 to open it.

Figure 4:
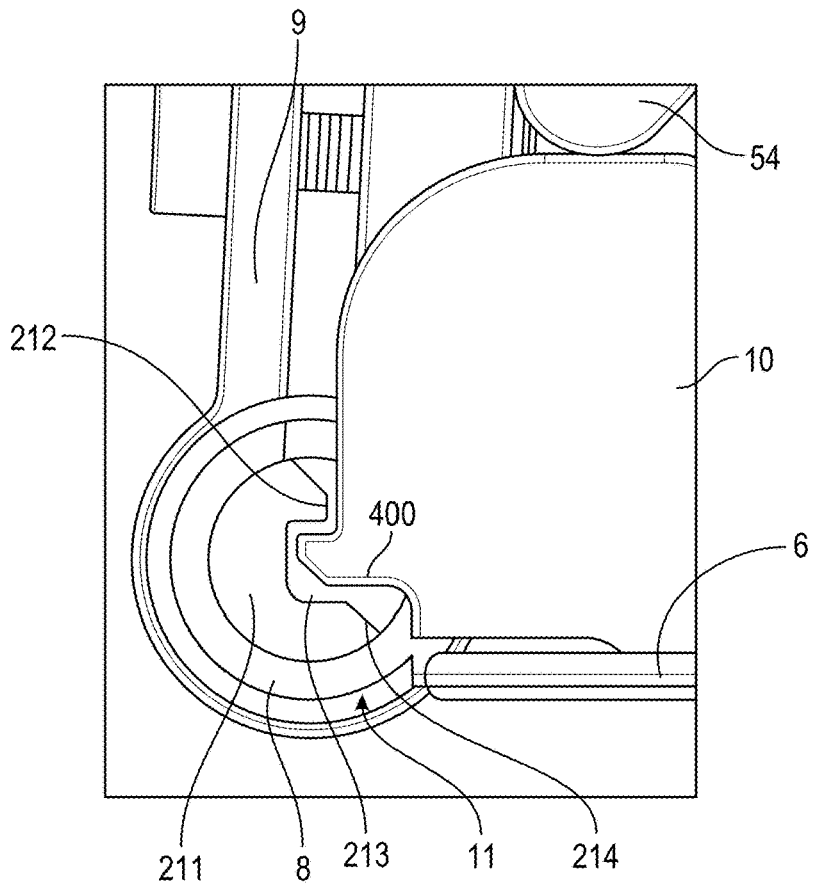
FIG. 4 is an enlarged side view of the drive device of the mechanism for locking the valve according to a second example of embodiment.

According to a second embodiment shown in FIG. 4, the drive device 11 comprises a ring 211 secured to the third axle 90. The ring 211 is advantageously arranged on the second end of the third axle 90 opposite the control lever 9. The ring 211 and the third axle 90 form for example a one-piece body.

The ring 211 has a surface 212 with which the interface 10 is configured to abut when the second flap 6 is closed and a groove 213 in which the interface 10 is configured to engage when locked.

In this second embodiment, the operator drives in rotation with the first flap 5 to the closed position, which drives in rotation the second flap 6 to the closed position. The main lever 51 is then locked in order to lock the first flap 5. Simultaneously, the interface 10 of the second flap 6 abuts the external surface 212 of the ring 211. This causes the ring 211 to rotate in a first direction which causes the third axle 90 to rotate. The control lever 9 is then driven in rotation into the unlocked position in the first direction. The force exerted by the operator allows the interface 10 to engage in the groove 213 of the ring 211, causing the ring 211 to rotate in a second direction opposite to the first direction. The interface 10 is then engaged in the groove 213 locking the second flap 6 in the locking position. At the same time, the third axle 90 is rotated, causing the control lever 9 to rotate into the locking position in a second direction opposite to the first direction.

To open the second flap, the operator operates the control lever 9 in the first direction to rotate the third axle 90. The ring 211 is driven in rotation and an internal surface 214 comes into abutment with a complementary surface 400 of the interface 10. The force exerted on the interface 10 by the ring 211 allows to drive in rotation the second flap 6 to open it.

Figure 5:
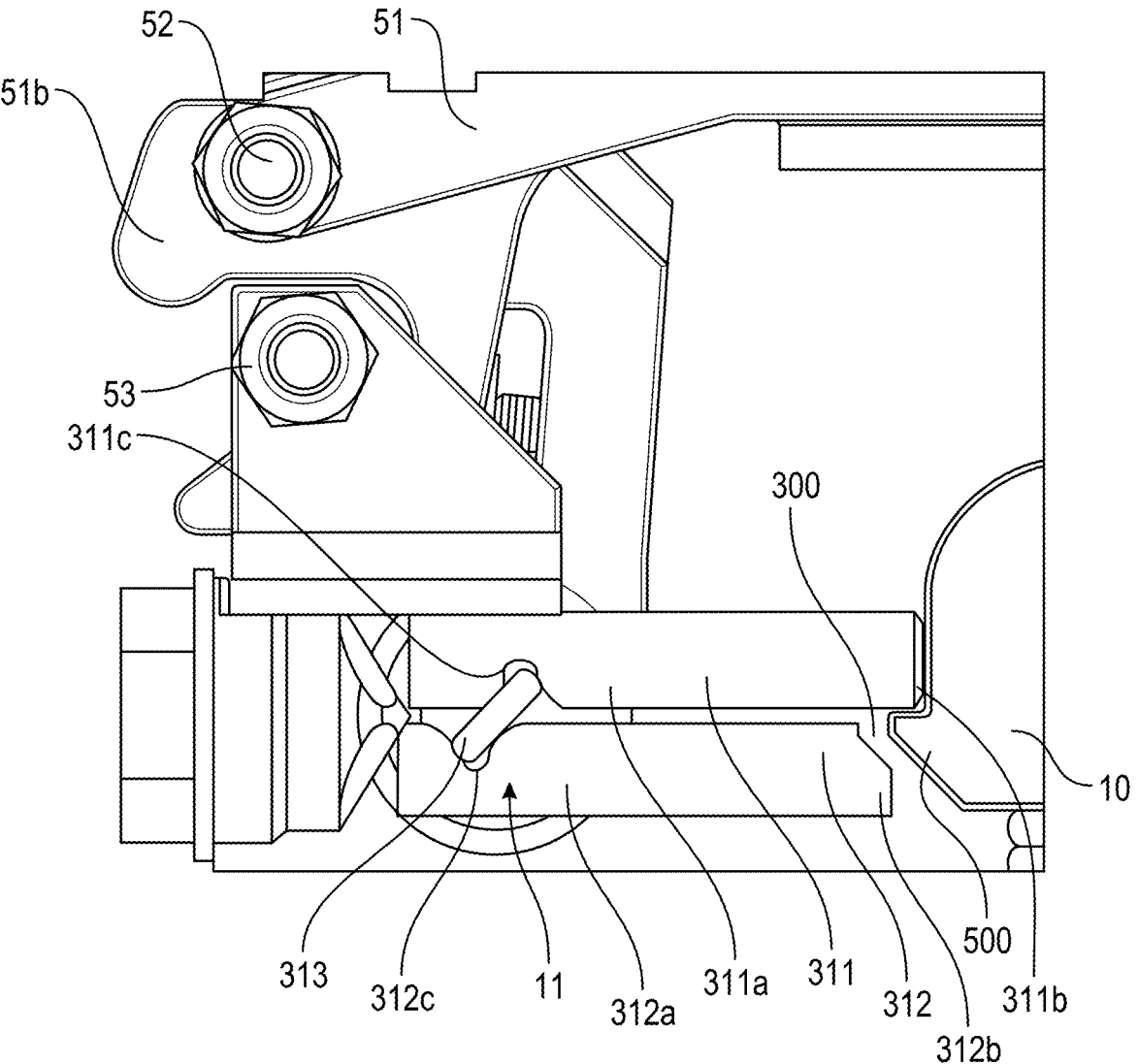
FIG. 5 is an enlarged side view of the drive device of the mechanism for locking the valve according to a third example of embodiment.

According to a third embodiment shown in FIG. 5, the drive device 11 comprises a first ram 311 having a first cylindrical body 311*a* and a first free end 311*b* adapted to co-operate with the interface 10, and a second cylinder 312 having a second cylindrical body 312*a* and a second free end 312*b* adapted to co-operate with the interface 10, the third axle 90 being engaged in the first and second cylindrical bodies 311*a*, 312*a*. Preferably, the second free end 312*b* is bevelled. The first cylinder 311 and the second cylinder 312 are advantageously parallel. They also extend along an axle perpendicular to the third axle 90 and the longitudinal axis X.

Advantageously, the free end of the third axle 90 comprises a tenon 313. The first cylindrical body 311*a* has a first housing 311*c* and the second cylindrical body 312*a* has a second housing 312*c*, with the tenon 313 engaged in the first and second housings 311*c*, 312*c*.

In this third embodiment, the operator drives in rotation the first flap 5 to the closed position, which drives in rotation the second flap 6 to the closed position. The main lever 51 is then locked in order to lock the first flap 5. Simultaneously, the interface 10 of the second flap 6 comes into abutment with the free end 311*b* of the first cylinder 311. This causes the first cylinder 311 to translate in a first direction causing the tenon 313 to rotate in the first and second housings 311*c*, 312*c* and thus the third axle 90 to rotate. The control lever 9 is then driven in rotation into the unlocked position in the first direction. The force exerted by the operator allows the interface 10 to be inserted between the first cylinder 311 and the second cylinder 312.

To open the second flap, the operator operates the control lever 9 in the first direction to drive in rotation the third axle 90. The tenon 313 is driven in rotation in each housing 311*c*, 312*c*. This has the effect of driving the second cylinder 312 in translation. The free end 312*b* of the second cylinder 312 comes into abutment with the interface 10. Advantageously, the interface 10 has a free end 500 with a complementary shaped surface to the bevelled free end 312*b* to facilitate cooperation with the free end 312*b* of the second cylinder 312. The force exerted on the interface 10 by the second cylinder 312 allows to drive in rotation the second flap 6 to open it.

Figure 6:
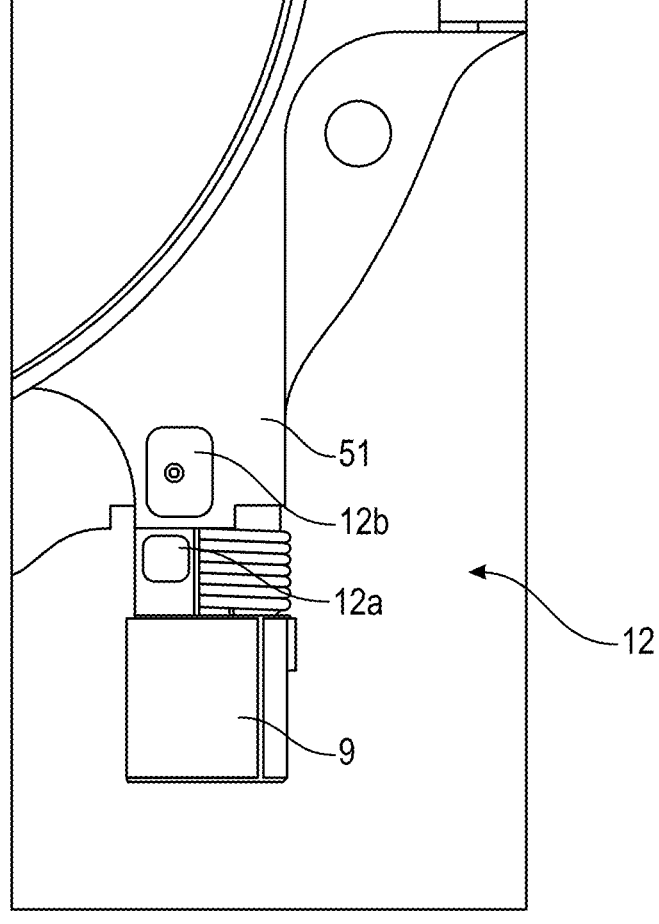
FIG. 6 is a top view of a component that can be fitted to the valve according to the disclosure.

As shown in FIG. 6, the valve 1 advantageously comprises a locking indicator 12 for the second flap 6. The locking indicator 12 is arranged on the control lever 9 and on the main lever 51. The locking indicator 12 comprises for example a first visual marker 12*a* arranged on the control lever 9 and a second visual marker 12*b* arranged on the main lever 51. In the closed and locking position of the second flap 6, the visual markers 12*a*, 12*b* are aligned. This increases the reliability of the locking of the second flap 6.

A method for opening the valve 1 will now be described.

The method of opening the valve 1 comprises a first step (a) of opening the first flap 5. The opening in step (a) takes place in the following sub-steps of:

(a1) unlocking the main lever 51, and (a2) rotating the first flap 5.

Then, a step (b) of opening the second flap 6 is performed. The opening is done in the following sub-step of:

(b1) rotating the control lever 9 in the first direction. This drives the drive device 11 and disengages the interface 10 from the drive device 11. Once the interface 10 is released from the drive device 11, the control lever 9 is driven back in the second direction.

A method of locking the second flap 6 will now be described. This method includes the following steps of:

(a') closing the second flap 6, (b') rotating the control lever 9 in the unlocked position, preferably in the first direction, and in which the interface 10 abuts the drive device 11, (c') rotating the control lever 9 in the locking position, preferably in the second direction opposite to the first, and in which the interface 10 is engaged in the drive device 11.

The step (a') advantageously comprises the sub-step (a1') of driving in rotation the first flap 5 and the second flap 6 by the first flap 5. This sub-step is for example performed by rotating the main lever 51.

Then a sub-step (a2') of locking the first flap 5 is performed by locking the main lever 51.

The first flap 5 and the second flap 6 are then closed and locked.

Thus, according to the disclosure, it is possible to reliably close and lock the second flap 6 since the control lever 9 is mobile in rotation in two opposite directions indicating the correct locking of the second flap 6. In addition, in the event of a deposit preventing the second flap 6 from closing properly and thus the control lever 9 from rotating in the second direction back into the locking position, the operator can operate the control lever 9 directly and force the control lever 9 into the locking position. This further improves the reliability of the mechanism 8 for locking the second flap 6.

According to the disclosure, the control lever 9 is arranged around the third axle 90 and is secured in rotation with the third axle 90.

According to the disclosure, the second flap 6 is mobile in rotation between three positions. A first opening position. A second, unlocked closing position and a third, locked closing position.

According to the disclosure, the drive device 11 is movable between two states. When the second flap 6 is in the second position, the drive device 11 is in the first state. When the second flap 6 is in the third position, the drive device 11 is in the second state. When the second flap 6 is in the first opening position, the drive device 11 is in the second state.

In the first state of the drive device 11 associated with the second position of the second flap 6, the interface 10 is in abutment with the drive device 11.

In the second state of the drive device 11 associated with the third position of the second flap 6, the interface 10 is engaged in the drive device 11.

In the second state of the drive device 11 associated with the first position of the second flap 6, as seen in FIG. 1, the interface 10 does not cooperate with the drive device 11.

When closing the second flap 6, the drive device 11 drives in rotation the third axle 90, which drives the control lever 9, which is secured in rotation with the third axle 90. The locking mechanism 8 of the disclosure is reversible. This allows the second flap 6 to open. When opening the second flap 6, the control lever 9 rotates the third axle 90 and drives the drive device 11 which cooperates with the interface 10 to open the second flap 6.

The drive device 11 cooperates with the third axle 90 and the interface 10. In particular, in all the embodiments, the interface 10 comprises a hook 101 adapted to engage a housing of the drive device 11 when the second flap 6 is in a closed and locked position. In the first example of embodiment, the housing is formed by the notch 111*a*.

In the second example of embodiment, the housing is formed by the groove 213.

In the third example of embodiment, the housing is formed by a space 300 delimited by the free ends 311*b*, 312*b* of the first and second cylinders 311, 312. In the locking position of the control lever 9, the free end 311*b* of the first cylinder 311 is radially offset with respect to the free end 312*b* of the second cylinder 312, thus forming the space 300.

Figure 7:
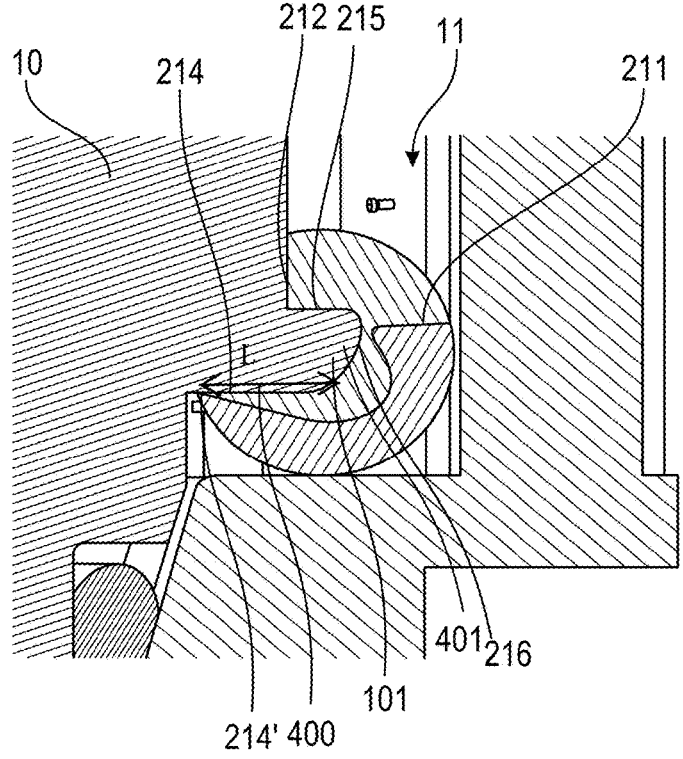
FIG. 7 is an enlarged side view of the drive device of the mechanism for locking the valve according to a fourth example of embodiment.
Figure 8:
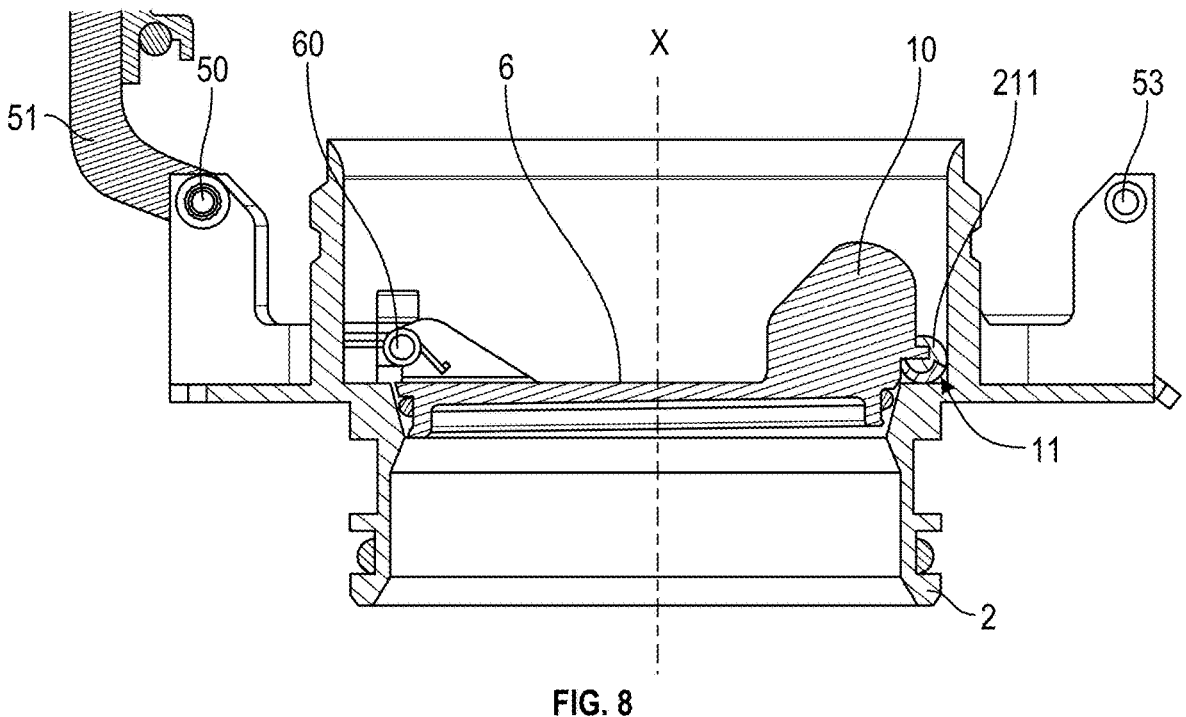
FIG. 8 is a longitudinal sectional view of the valve according to the disclosure in the closed position and comprising the drive device of FIG. 7.

According to a fourth example of embodiment shown in FIGS. 7 and 8, the drive device 11 comprises the ring 211. The ring 211 is housed in the body 2 of the valve 1. The ring 211 is secured to the third axle 90 as in the second example of embodiment shown in FIG. 4. The third axle 90 is therefore housed in the body 2.

The ring 211 has a C-shape. The ring 211 has the surface 212, also called first surface 212, with which the interface 10 can come into abutment for the closing of the second flap 6. The ring 211 also comprises the groove 213 in which the interface 10 is able to engage, in particular, via the hook 101. The ring 211 further has the internal surface 214, also referred to as the second surface 214, with which the interface 10 can come into abutment when the second flap 6 is opened.

The second surface 214 is perpendicular to the first surface 212. The ring 211 further comprises a third internal surface 215 parallel to the second surface 214 and connected to the first surface 212. The third internal surface 215 is connected to the second surface 214 by a rounded internal surface 216.

The hook 101 has a complementary shape to the ring 211. The hook 101 comprises the surface 400 complementary to the second surface 214 and a rounded portion 401 complementary to the rounded surface 216. The rounded portion 401 is protruding. The rounded portion 401 is housed in the groove 213 in the locking position.

To close, the hook 101, and in particular the rounded portion 401, comes into abutment with the first surface 212, which rotates the control lever 9 into its unlocked position. The hook 101, and in particular the rounded portion 401, is then received in the groove 213, which rotates the control lever 9 into its locking position.

The ring 211 has a pointed end 214' which facilitates the opening of the second flap 6 via the interface 10 when the control lever 9 is operated to open it. The pointed end 214' comes into abutment with the complementary surface 400 of the interface 10 enabling the second flap 6 to be driven in rotation for its opening with a leverage effect. More particularly, the second surface 214 is connected to an external surface 216 of the ring 211 by an edge forming the pointed end 214'.

The distance L between the centre of the ring 211 and the pointed end 214' as measured radially with respect to the longitudinal axis X is between 2 mm and 5 mm, preferably between 3 mm and 3.5 mm. Such a distance L enables sufficient leverage effect to be exerted to force the second flap 6 open, for example in the event of deposits, such as ice, preventing the second flap 6 from opening.

The invention claimed is:

1. A discharge valve for an aircraft comprising:
a cylindrical body having an inlet orifice and an outlet orifice,
a first flap,
a second flap arranged inside the body, the first and second flaps being mobile in rotation about a first axle and a second axle respectively, between a closed position and an open position,
a mechanism for locking the second flap in the closed position, comprising:
a control lever arranged around a third axle,
an interface arranged on the second flap and
a drive device configured to rotate the third axle,
wherein the control lever is secured in rotation with the third axle between an unlocking position, in which the interface is in abutment against the drive device, and a locking position, in which the interface is engaged in the drive device,
wherein the drive device comprises a ring secured to the third axle and having a surface with which the interface selectively comes into abutment and a groove in which the interface is selectively engaged, and
wherein the ring comprises a pointed end configured to come into abutment with a complementary surface of the interface when the second flap opens.

2. The valve according to claim 1, wherein the third axle is arranged in a wall mounted on the cylindrical body of the valve opposite the first and second axles with respect to a longitudinal axis (X) of the cylindrical body.

3. The valve according to claim 1, further comprising a main lever extending over the first flap and configured to drive the first flap and the second flap from the open position to the closed position.

4. The valve according to claim 1, wherein the ring has an internal surface configured to come into abutment with the complementary surface of the interface when the second flap is opened, the internal surface being connected to an external surface of the ring by an edge forming the pointed end.

5. The valve according to claim 1, wherein the control lever is mobile in rotation in the unlocking position in a first direction and in the locking position in a second direction opposite to the first direction.

6. A method of locking a second flap of a valve according to claim 1, comprising the following steps of:
closing the second flap,
rotating the control lever into an unlocking position in which the interface comes into abutment with the drive device, and
rotating the control lever into the locking position in which the interface is engaged with the drive device.

7. A discharge valve for an aircraft comprising:
a cylindrical body having an inlet orifice and an outlet orifice,
a first flap,
a second flap arranged inside the body, the first and second flaps being mobile in rotation about a first axle and a second axle respectively, between a closed position and an open position,
a mechanism for locking the second flap in the closed position, comprising:
a control lever arranged around a third axle,
an interface arranged on the second flap and
a drive device configured to rotate the third axle,
wherein the control lever is secured in rotation with the third axle between an unlocking position, in which the interface is in abutment against the drive device, and a locking position, in which the interface is engaged in the drive device,
wherein the drive device comprises a rack having a toothed body cooperating with the third axle and an end portion configured to cooperate with the interface.

8. The valve according to claim 7, wherein the end portion has a notch into which the interface is configured to engage and a free end with which the interface selectively comes into abutment.

9. A discharge valve for an aircraft comprising:
a cylindrical body having an inlet orifice and an outlet orifice,
a first flap, a second flap arranged inside the body, the first and second flaps being mobile in rotation about a first axle and a second axle respectively, between a closed position and an open position, a mechanism for locking the second flap in the closed position, comprising:

a control lever arranged around a third axle, an interface arranged on the second flap and a drive device configured to rotate the third axle, wherein the control lever is secured in rotation with the third axle between an unlocking position, in which the interface is in abutment against the drive device, and a locking position, in which the interface is engaged in the drive device, wherein the drive device comprises:

a first cylinder having a first cylindrical body and a first free end configured to cooperate with the interface, and a second cylinder having a second cylindrical body and a second free end configured to cooperate with the interface, the third axle being engaged in the first and second cylindrical bodies.

10. The valve according to claim 9, wherein the third axle comprises a free end having a tenon, and the first cylindrical body has a first housing and the second cylindrical body has a second housing, the tenon being engaged in the first and second housings.

11. The valve according to claim 9, wherein the second free end is beveled.

* * * * *